(12) United States Patent
Hwang

(10) Patent No.: US 8,204,520 B2
(45) Date of Patent: Jun. 19, 2012

(54) SYSTEM AND METHOD FOR ROUTING SHORT MESSAGE SERVICE SPECIAL NUMBER MESSAGES TO LOCAL SPECIAL NUMBER ANSWERING POINTS

(75) Inventor: Kuen-Yih Hwang, Naperville, IL (US)

(73) Assignee: West Corporation, Omaha, NE (US)

( * ) Notice: Subject to any disclaimer, the term of this patent is extended or adjusted under 35 U.S.C. 154(b) by 767 days.

(21) Appl. No.: 11/754,451

(22) Filed: May 29, 2007

(65) Prior Publication Data

US 2008/0045250 A1 Feb. 21, 2008

Related U.S. Application Data

(60) Provisional application No. 60/803,730, filed on Jun. 2, 2006.

(51) Int. Cl.
*H04W 4/00* (2009.01)

(52) U.S. Cl. .................. 455/466; 455/404.1; 455/414.1; 379/111; 709/206

(58) Field of Classification Search ............... 455/404.1, 455/414.1; 379/111, 45, 37
See application file for complete search history.

(56) References Cited

U.S. PATENT DOCUMENTS

| | | | |
|---|---|---|---|
| 2003/0109245 A1* | 6/2003 | McCalmont et al. | 455/404 |
| 2004/0105529 A1* | 6/2004 | Salvucci et al. | 379/45 |
| 2004/0192271 A1* | 9/2004 | Eisner et al. | 455/414.1 |
| 2004/0203569 A1* | 10/2004 | Jijina et al. | 455/404.1 |
| 2005/0053209 A1* | 3/2005 | D'Evelyn et al. | 379/111 |
| 2007/0117577 A1* | 5/2007 | Harris | 455/466 |

* cited by examiner

*Primary Examiner* — Kamran Afshar
*Assistant Examiner* — Shahriar Behnamian

(57) ABSTRACT

A system and method that overrides the initial destination number of an SMS message based on the destination number in the message itself. The communications device, a serving MSC or STP checks the destination address and overwrites the default SMSC address with a local special number service center address when it detects a special number destination address recognized anywhere in the world (e.g., 9-1-1, 1-1-2, 1-1-0, etc.). The message is then delivered to a local special number service center. The special number service center then delivers the message to an answering point, which then communicates with the caller.

9 Claims, 5 Drawing Sheets

SYSTEM AND METHOD FOR ROUTING SHORT MESSAGE SERVICE SPECIAL NUMBER MESSAGES TO LOCAL SPECIAL NUMBER ANSWERING POINTS

CROSS-REFERENCE TO RELATED APPLICATION

This patent application is related to and claims the benefit of the filing date of U.S. Provisional Patent Application No. 60/803,730 entitled "System and Method for Routing Short Message Service Special Number Messages to Local Special Number Answering Points," which was filed on Jun. 2, 2006 by Kuen-Yih Hwang, and which is incorporated by reference herein in its entirety.

BACKGROUND OF THE INVENTION

The present invention is directed to routing of special number short message service messages to local special number answering points, and, more specifically, to a system and method that routes short message service messages made to emergency services numbers to an answering point local to the sender.

Most wireless communications service providers offer short message services ("SMS") as an option. An SMS subscriber may send short messages to another SMS-enabled communications device virtually anywhere in the world. SMS is particularly popular in Asia-pacific countries, where most wireless communications devices include SMS.

In some countries, special number messaging (e.g., emergency services) is supported by the SMS systems. An SMS subscriber may enter a special telephone number and send a message to a local answering point (e.g., a public safety answering point or "PSAP"). Such special telephone numbers, however, are simply another local telephone number, much in the same manner as telephone numbers for police, fire, ambulance, etc. were prior to special number service (e.g., 9-1-1, 1-1-2, 1-1-0, etc.) in the wireline network.

Simply adding special number dialing to SMS is not currently possible, giving current SMS routing protocols. An SMS message is initially routed to a short message service center ("SMSC") run by the service provider using a telephone number pre-programmed into the communications device. The SMSC determines how to route the message using the called number in the message. The message is then delivered in a "store-and-forward" manner. There is no guarantee that the SMSC can route a message to an appropriate answering point for special number calls. Further, there is no guarantee that the message will reach the special number answering point in a timely manner. Additionally, if the message sender is in another country, the message must still travel back to the SMSC in the home country of the service provider of the message sender and then may not be delivered to a special number answering point in the country where the message sender currently is located.

Therefore, a problem in the art is that a person trying to use SMS to contact a special number answering point cannot be certain that the message will be answered in a timely manner by a local answering point that can handle the call locally.

SUMMARY OF THE INVENTION

This problem is solved and a technical advance is achieved in the art by a system and method that overrides the initial destination number of a short message service ("SMS") message based on the destination number in the message itself. In one exemplary embodiment, the communications device overrides the default SMSC address with a local special number service center address. In another exemplary embodiment, a mobile switching center ("MSC") checks the destination address and overrides the default SMSC address with a local special number service center address when it detects a special number destination address recognized anywhere in the world (e.g., 9-1-1, 1-1-2, 1-1-0, etc.). Alternatively, a signaling transfer point ("STP") in the communications path checks each SMS message's content for special numbers in the destination field. Preferably the STP that checks the message is the first STP that the message is routed to. Also preferably, such special number messages receive a higher priority than normal SMS traffic. The message is then routed to a local special number service center. The special number service center then delivers the message to an answering point, which then communicates with the caller.

In accordance with one exemplary embodiment of this invention, there is one answering point that serves a region or area responsive to special number SMS messages. In accordance with another exemplary embodiment, the special number service center requests location information regarding the sending communications device from the network. For example, the special number service center requests location information from a GSM system's GMLC where the call originated. The special number service center then delivers the message to a special number answering point that is local to the caller.

Thus, in accordance with this invention, a user is enabled to send a message to any special number and have a local special number answering point respond.

BRIEF DESCRIPTION OF THE DRAWINGS

A more complete understanding of this invention may be obtained from a consideration of this specification taken in conjunction with the drawings, in which.

DETAILED DESCRIPTION

Figure 1:
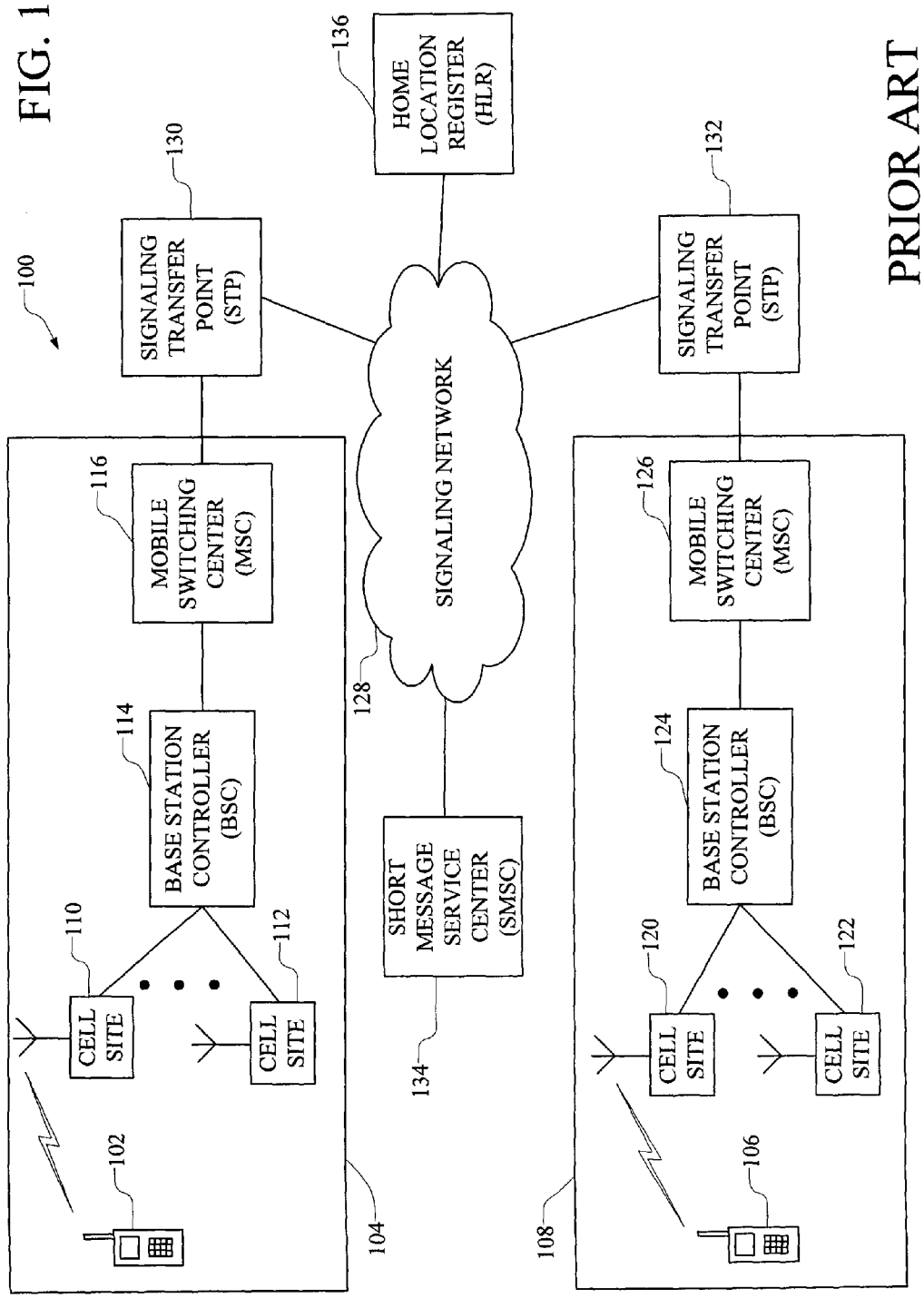
FIG. 1 depicts a communications network in accordance with a prior art short message service system.

This invention provides a system and method for providing universal special number short message service ("SMS"). In essence, the destination field in each message is checked to determine whether the destination number or address is a special number. If the destination number is a special number, then the original address of the short message service center ("SMSC") is overwritten with an address or number of a service center that then routes the message to an answering point. In this manner, an SMS user may send messages to familiar special numbers wherever that user may be, and the message will be routed to a local answering point.

The system and method of this invention is described herein in terms of the special number being emergency services special numbers, such as 9-1-1 in the U.S. and Canada, 1-1-2 in Europe and 1-1-0 in China. One skilled in the art will realize how to adopt this invention to other special number services after studying this specification. Further, this invention is described in the context of a GSM wireless communications system. One skilled in the art will realize how to adopt this invention to any wireless communications system after studying this specification.

In order to understand the advantages of this invention, it is instructive to understand current SMS operation. To this end, FIG. 1 comprises a simplified block diagram of a prior art communications network, illustrated generally at 100. Communications network 100 is generally described herein in the context of a GSM wireless communications network. For purposes of this example, the user of SMS-enabled mobile communications device 102 in wireless network 104 sends a message to the user of SMS-enabled mobile communications device 106 in wireless communications network 108.

Wireless communications network 104 comprises a plurality of cell sites, represented by cell site 110 and cell site 112 that provide a radio interface to wireless communications devices, such as SMS-enabled mobile communications device 102. Cell sites 110 and 112 are connected to a base station controller (BSC) 114, which provides coordination and a first level of control over its attached cell sites. BSC 114 is connected to mobile switching center (MSC) 116. MSC 116 provides overall control of wireless communications network 104. In operation, wireless communications network 104, would include many more BSC's and cell sites, but these are omitted for clarity.

Likewise, wireless communications network 108 comprises a plurality of cell sites, represented by cell site 120 and cell site 122. Cell sites 120 and 122 are connected to BSC 124, which is connected to MSC 126. Like wireless communications network 104, an operational wireless communications network 108 would include many more BSC's and cell sites, which are omitted for clarity.

In order to provide SMS (and for other purposes, which are not germane to this invention and therefore not described), MSC 116 and MSC 126 are connected to a signaling network 128 via a signaling transfer point (STP) 130 and STP 132, respectively. While STP's 130 and 132 are illustrated herein as separate from signaling network 128, one skilled in the art will realize that STP's 130 and 132 are part of signaling network 128. Signaling network 128 comprises a plurality of interconnected STP's as is known in the art. An exemplary signaling network comprises, in this exemplary embodiment, a signaling system 7 (SS7) network. One skilled in the art will realize that any signaling network may be used to provide the services described in this specification.

A short message service center (SMSC) 134 is connected to signaling network 128 to provide a service center to distribute messages, as will be described further, below. Signaling network 128 is also connected to a plurality of home location registers, represented by home location register (HLR) 136. As is known in the art, HLR 136 keeps track of wireless communications devices associated with a particular wireless communications network. HLR 136 is illustrated herein as being separate from wireless communications network 104 and wireless communications network 108. One skilled in the art understands that HLR 136 may be associated with wireless communications network 104, wireless communications network 108 or another wireless communications network (not illustrated herein).

Figure 2:
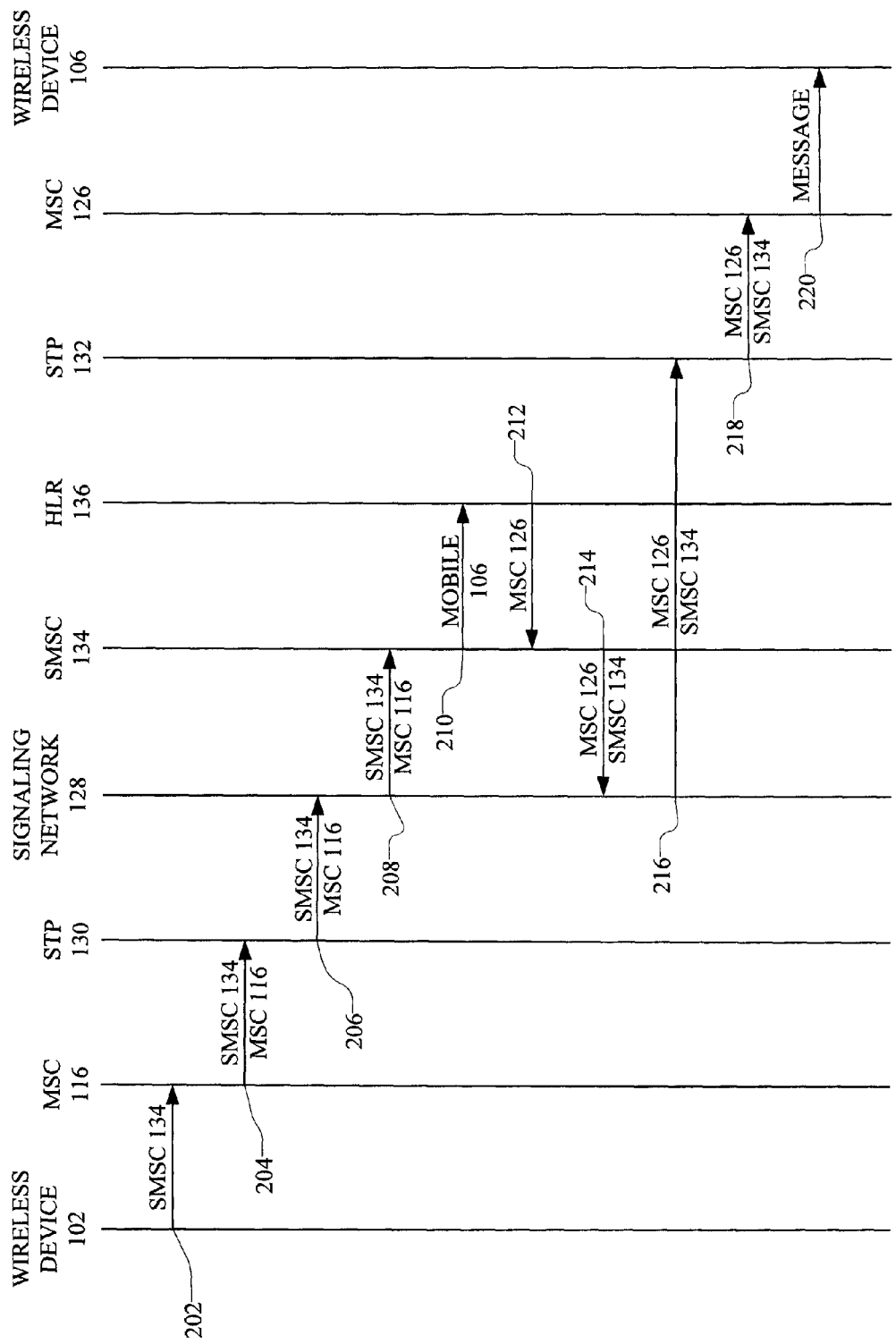
FIG. 2 depicts a call flow through the communications network of FIG. 1 in accordance the prior art.

Turning now to FIG. 2, SMS message communication in accordance with the prior art is described in the context of FIG. 1. In this example, the user of SMS-enabled mobile communications device 102 sends a message to the user of SMS-enabled mobile communications device 106. Also for purposes of this example, SMS-enabled mobile communications device 106 is roaming out of its home wireless communications network and is located in wireless communications network 108. In the following description, the term "address" is used to mean E.164 forward address. Such addresses are currently implemented as telephone numbers. "Address" is used herein to avoid confusion with the ordinary meaning of "telephone number," because wireless devices 102 and 106 also have telephone numbers.

The user of SMS-enabled mobile communications device 102 enters the address of SMS-enabled mobile communications device 106 and enters a text message. At step 202, the user then presses send. SMS-enabled mobile communications device 102 adds the address of SMSC 134 to the message and sends the message to cell site 110. Cell site 110 forwards the message to BSC 114, which in turn forwards the message to MSC 116. In step 204, MSC 116 adds its own address as the "from" field and forwards the message to STP 130 and thus, in step 206, into signaling network 128.

The message is delivered to SMSC 134 at step 208. SMSC 134 then determines the serving MSC address of the destination SMS-enabled mobile communications device 106 by querying the HLR associated with SMS-enabled mobile communications device 106, which, for purposes of this description, is HLR 136, in step 210. In step 212, HLR 136 reports back to SMSC 134 that SMS-enabled mobile communications device 106 is currently being served by MSC 126 and delivers the address of MSC 126.

SMSC 134 sends the message back into signaling network 128, with the addressed of MSC 126 and the address of SMSC 134, in step 214. In step 216, signaling network 128 forwards the message to STP 132.

MSC 126 receives the message in step 218 and determines that SMS-enabled mobile communications device 106 is currently in communication with cell site 120. In step 220, MSC 126 sends the message to cell site 120. Cell site 120 forwards the message to SMS-enabled mobile communications device 106.

The above-described call flow is followed regardless of the location of the sending and receiving communications devices. SMSC 134 operates in a store-and-forward manner and communication of the message may not be delivered immediately. Significantly, if the sender is roaming in a communications network other than the sender's home communications network, then above-described call flow is still followed. Therefore, if the sender is roaming in a foreign country, the message is still sent to the SMSC of the SMS-enabled mobile communications device's home network. If the sender is in China, for example, and attempts to send a message to emergency services, the message is still sent to the home SMSC, which may or may not support emergency short message service in the first instance.

Figure 3:
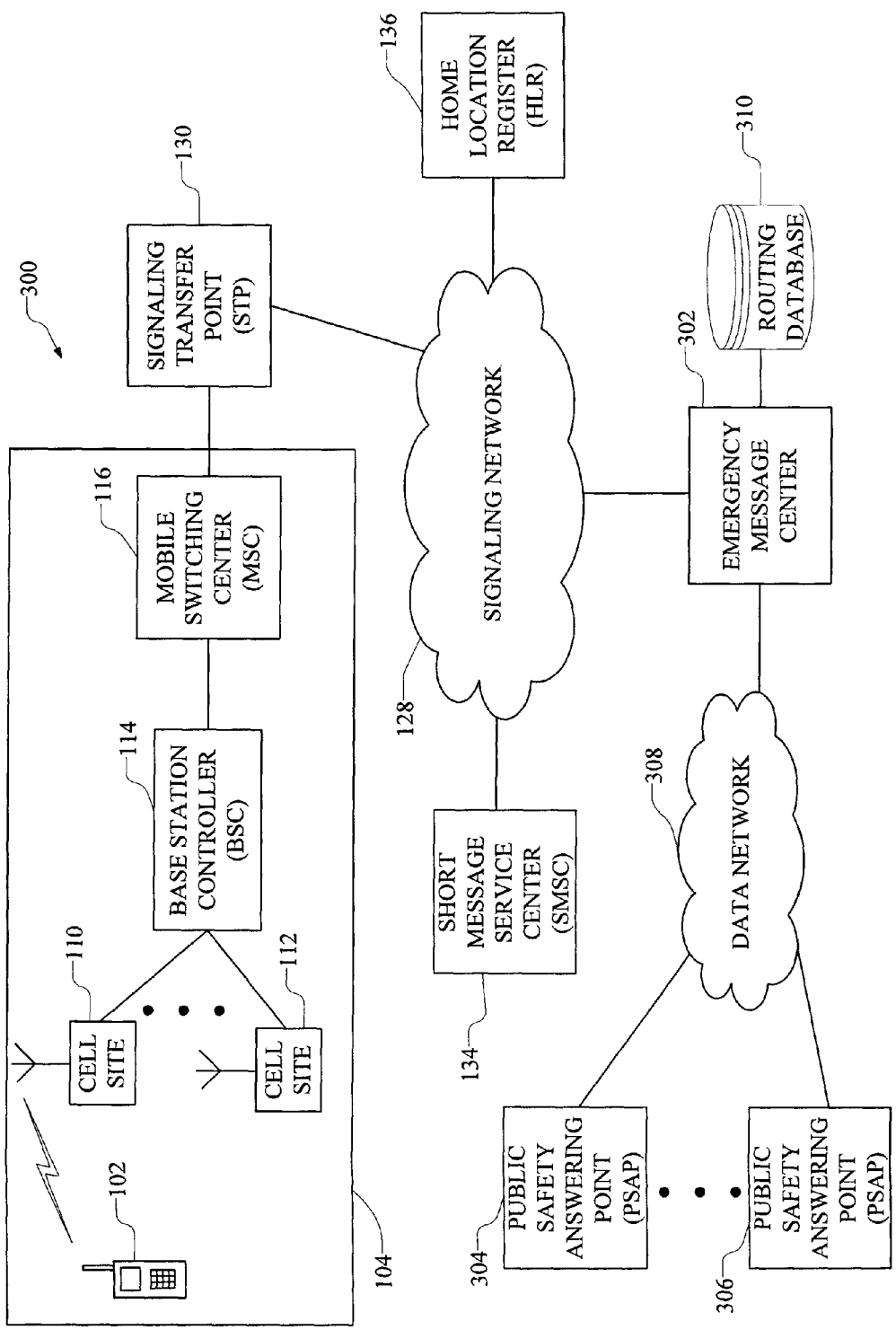
FIG. 3 depicts a communications network in accordance with an exemplary embodiment of the present invention.

This problem is solved by a system and method that overrides the primary destination address at some point in the path of the message. An exemplary embodiment of this invention is illustrated in the block diagram of FIG. 3. A communications network 300 includes wireless communications network 104 as described above in connection with FIG. 1. Communications network also includes STP 130, signaling network 128, SMSC 134 and HLR 136, which are all described above in connection with FIG. 1.

An emergency message center 302 is added to communications network 300 in accordance with this invention. Emergency message center 302 receives emergency messages and routes such messages to one of a plurality of public safety answering points, represented by public safety answering point (PSAP) 304 and PSAP 306 via a data network 308, advantageously via Internet protocol (IP). As will be described further, below, emergency message center 302 advantageously uses data stored in routing database 310 to determine the destination PSAP. While emergency message center 302 is illustrated herein as connected to PSAP's 304 and 306 via data network 308, one skilled in the art will appreciate that there are many forms of communication possible between emergency message center 302 and PSAP's 304 and 306. For example, emergency message center 302 may be directly connected via any communications wireline or wireless means, such as, but not limited to, a data network (e.g., the Internet).

Messages that are internally addressed to any of the world's emergency number are directed to emergency message center 302. Such redirection of an emergency message may occur by one of several methods. In accordance with a first exemplary embodiment of this invention, an SMS-enabled mobile communications device itself diverts the message to emergency message center 302 when the destination number is a predefined special number, such as 9-1-1, 1-1-2, 1-1-0, etc. Instead of addressing the message to the default SMSC, as is done in the art, the message is addressed to emergency message center 302, which is preferably local to the SMS-enabled mobile communications device. Emergency message center 302 then forwards the message to a PSAP. An operator at PSAP 304 may then send a message back to the sending SMS-enabled mobile communications device, attempt to call the sending SMS-enabled mobile communications device or takes other action appropriate to the situation.

In order to support this embodiment, an SMS-enabled mobile communications device receives a local emergency message center address as part of initial registration with MSC 116. Alternatively, a user may request the address of the local emergency message center and manually program the address into the SMS-enabled mobile communications device. Such request may be via short messages, a telephone call, querying a web page, etc.

In another embodiment, MSC 116 reviews every message to determine if the ultimate destination telephone number is any of the world's recognized special emergency numbers. If the ultimate destination number is a special number, then MSC 116 overrides the address of SMSC 134 with the address of emergency message center 302. Alternatively, MSC 116 addresses the short message with an emergency code, such as 9-1-1, 1-1-0, etc. When STP 130 receives the message with the emergency code, STP 130 replaces the code with the address of emergency message center 302.

In a further alternative embodiment, STP 130 reviews every message to determine if the ultimate destination telephone number is any of the world's recognized special emergency numbers. If so, then STP 130 replaces the address of SMSC 134 with the address of emergency message center 302. In yet a further alternative embodiment, SMSC 134 receives the message and determines whether the ultimate destination number is any of the world's recognized special emergency numbers. If it is, then SMSC 134 addresses and sends the message to emergency message center 302. In this exemplary embodiment, SMSC 134 preferably raises the priority of the message so that it is services out of order.

In accordance with another aspect of this invention, emergency message center 302 is connected to a plurality of PSAP's 304, wherein each one includes an operator that reads and writes a prespecified language. Emergency message center 302, in this exemplary embodiment, attempts to determine the language in which the message is written. Emergency message center 302 then queries routing database 310 for a PSAP and, optionally, an operator position, wherein the language of the message text is understood. Thus, emergency message center 302 attempts to route the message to an operator that is most likely to be able to help immediately.

Figure 4:
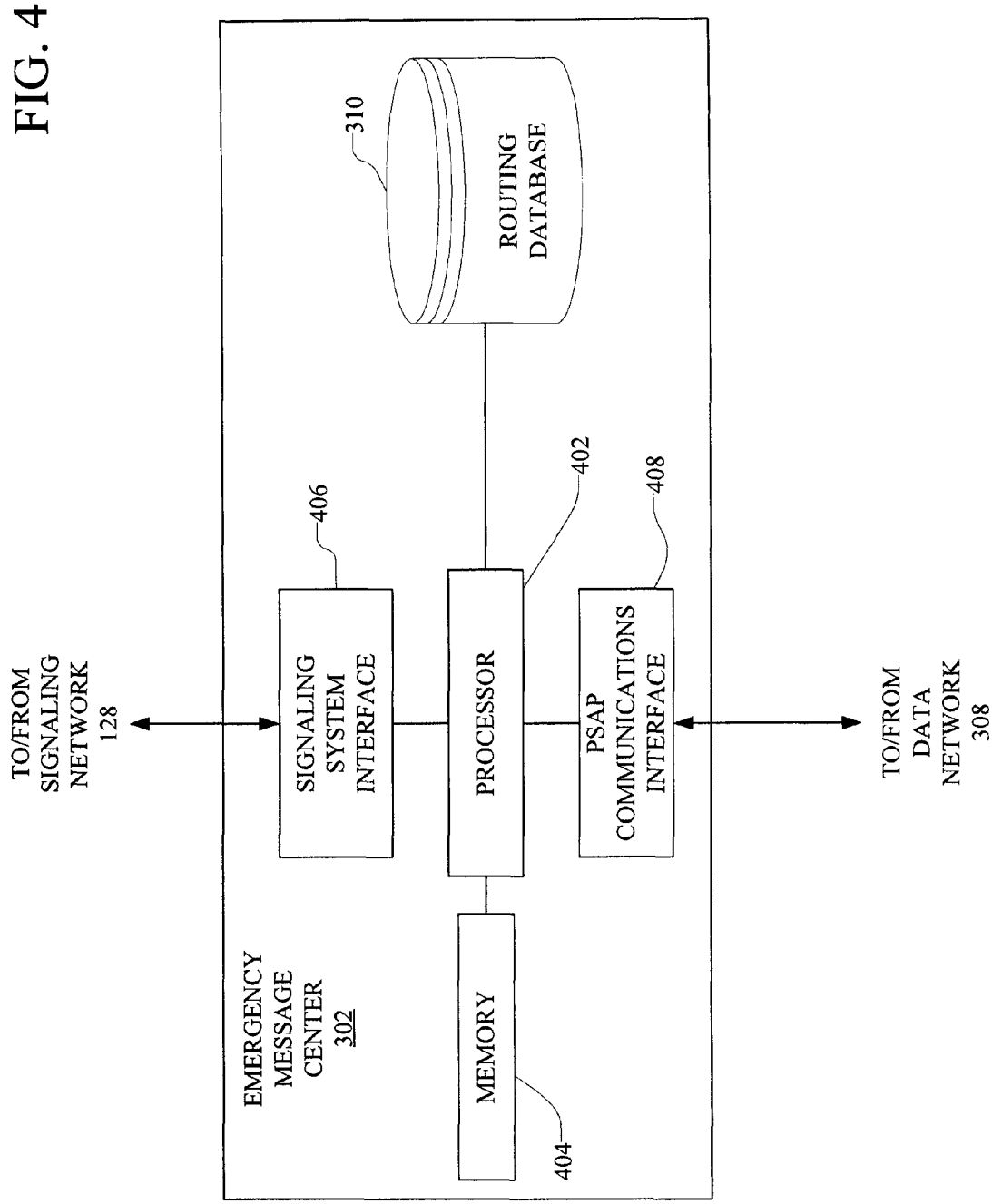
FIG. 4 is a block diagram depicting components of an emergency message center of FIG. 3 in accordance with an exemplary embodiment of the present invention.

Turning now to FIG. 4, a block diagram of an exemplary emergency message center 302 is illustrated. At the heart of emergency message center 302 is a processor 402 that controls the functionality of emergency message center 302 using programs and data stored in memory 404. Emergency message center 302 receives messages from signaling network 128 at signaling system interface 406. Signaling system interface 406 performs all of the protocol conversions necessary to receive and send messages from signaling network 128. PSAP communications interface 408 performs all of the protocol conversions necessary to send and receive messages from PSAP 304. Preferably, PSAP communications interface 408 comprises an Internet protocol (IP) interface. Routing database 310 is illustrated herein as being a separate entity from emergency message center 302, but may also be part of emergency message center 302 or some other entity in communications network 300.

Emergency message center 302 is illustrated herein as being a stand-alone entity in communications network 300. One skilled in the art understands that emergency message center may be part of an STP, part of a PSAP or part of another network entity. Further, one skilled in the art understands that the components of emergency message center 302 are preferably redundant for reliability.

Figure 5:
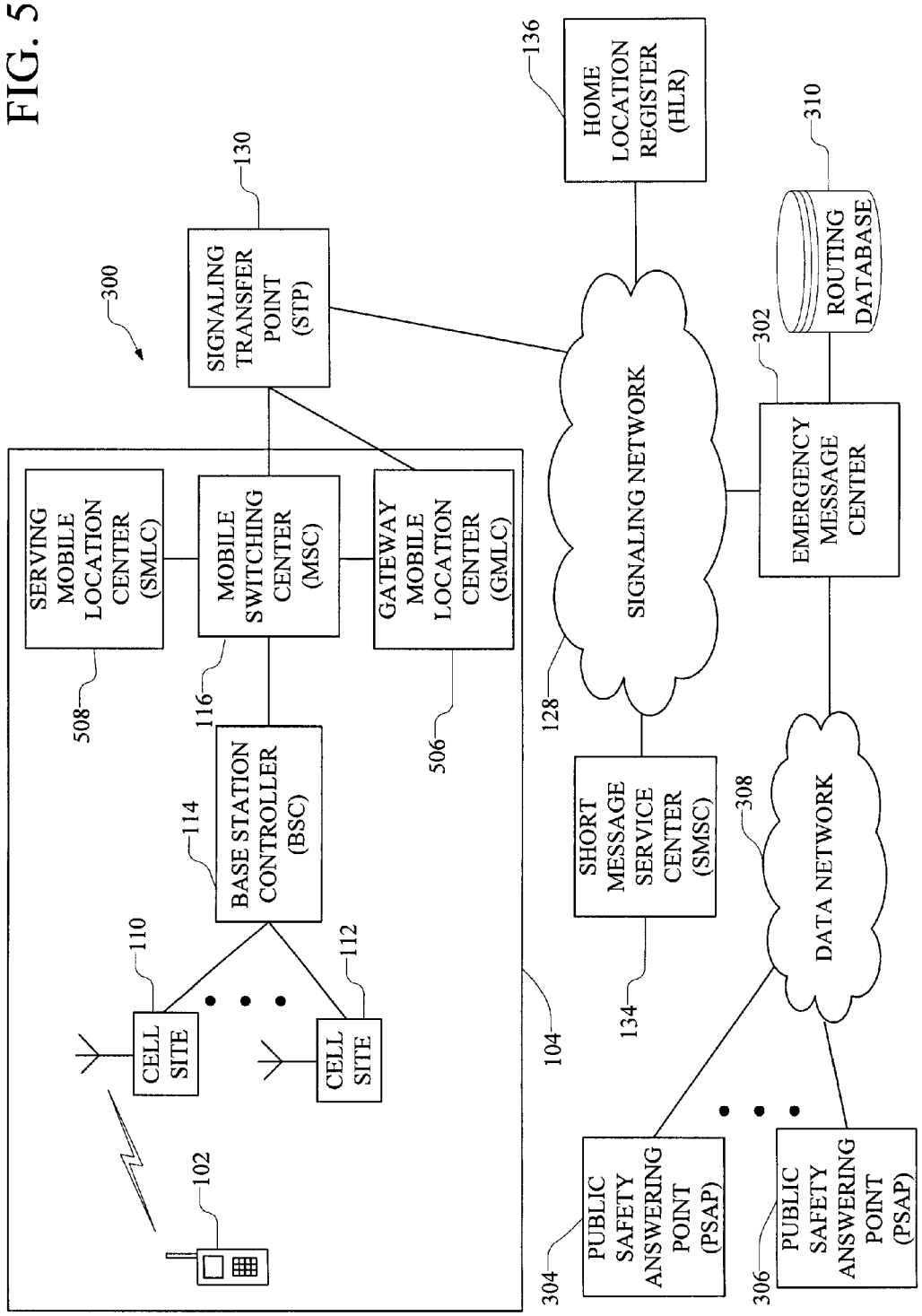
FIG. 5 is a call flow diagram depicting the operation of a method in the context of FIG. 3 in accordance with an exemplary embodiment of the present invention.

Turning now to FIG. 5, an expanded view of the communications network 300 is illustrated in block diagram. As mentioned above, emergency message center 302 is connected to one or a plurality of PSAP's, represented herein by PSAP 304 and PSAP 306, via data network 308. It is a goal of public safety communications that the call, or in this case, the message, is directed to the PSAP that can provide the most immediate aid to the requester.

In a first exemplary embodiment, an operator at a default PSAP that receives the message, such as PSAP 304, places a telephone call to the SMS-enabled communications device 102 that sent the emergency message. The operator at PSAP 304 requests location information as is currently practiced. The operator then forwards the call to a PSAP that serves the location where the call originated.

In another exemplary embodiment, emergency message center 302 requests location information from gateway mobile location center (GMLC) 506 via signaling network 128 and STP 130. Alternatively, emergency message center 302 may communicate with GMLC 506 via IP over a data network. GMLC 506 returns the information in X/Y coordinates that emergency message center 302 applies to database 310. Database 310 responds with a PSAP identification. Emergency message center 302 forwards the message directly to that PSAP. Alternatively, emergency message center 302 queries HLR 136 for the MSC, cell and sector. The returned information is applied to a database that indicates the most likely serving PSAP. Further alternatively, emergency message center 302 requests MSC 116 for X/Y coordinates. MSC 116 obtains the information from serving mobile location center (SMLC) 508, from BSC 114, cell site 110 or other system in wireless communications network 104. This data is then applied against a database and the message is routed to an appropriate PSAP. Finally, if the SMS-enabled communications device is also GPS capable, emergency message center 302 may interface with a user plane to obtain X/Y coordinates.

It is to be understood that the above-described embodiment is merely illustrative of the present invention and that may variations can be devised by one skilled in the art without departing from the scope of the invention. It is therefore intended that such variations be included within the scope of the following claims and their equivalents.

I claim:

1. A method for routing short message service (SMS) messages originating with an SMS-enabled wireless device and addressed to a special number addressee; the method comprising:
   (a) screening an SMS message for a special number addressee;
   (b) if a special number addressee is detected during said screening, in no particular order:
      (1) obtaining location information regarding current geographic position of said SMS-enabled wireless device;
      (2) substituting an address of a special message center for an address of a short message service center assigned to the SMS-enabled wireless communications device; and
      (3) routing the SMS message to the special message center; and
   (c) employing said location information to effect forwarding the SMS message from said special message center to a special number answering point generally most proximate to said current geographic position.

2. A method in accordance with claim 1 wherein screening an SMS message for a special number comprises said SMS-enabled wireless device screening the SMS message for a special number.

3. A method in accordance with claim 1 wherein screening an SMS message for a special number comprises a mobile switching center screening the SMS message for a special number.

4. A method in accordance with claim 1 wherein screening an SMS message for a special number comprises a signaling transfer point screening the SMS message for a special number.

5. A method in accordance with claim 1 wherein forwarding the message to a special number answering point comprises:
   identifying a determined special number answering point proximal to said SMS-enabled wireless communications device; and
   forwarding the SMS message to the determined special number answering point.

6. An emergency message center comprising:
   an interface configured to receive incoming short message service messages from a network;
   a short message service routing database; and
   a processor connected to said interface and said short message service routing database; said processor being configured for screening said short message service messages for special number addressees; if said processor detects a special number addressee in a respective said short message service message, said processor being configured for requesting or receiving location information relating to current geographic position of a sender of said respective incoming short message service message via said interface; said processor querying said short message service routing database using said location information and one or more parameters from said respective incoming short message service message to identify short message service routing information for a respective public safety answering position generally most proximate to said current geographic position for receiving said respective incoming short message service message; said processor effecting at least one of presenting and storing said short message service routing information.

7. An emergency message center in accordance with claim 6 further comprising:
   a public safety answering point interface connected to said processor and a data network and configured to receive or retrieve from storage said short message service routing information; said public safety answering point employing said short message service routing information to effect forward-routing said respective incoming short message service message via said data network to said respective public safety answering point generally most proximate to said position.

8. An emergency message center in accordance with claim 6 wherein said forward-routing is effected by an address of said respective public safety answering point generally most proximate to said position in said routing information.

9. An emergency message center in accordance with claim 8 wherein said one or more parameters includes a language.

* * * * *